(12) United States Patent
Ban et al.

(10) Patent No.: US 6,247,322 B1
(45) Date of Patent: Jun. 19, 2001

(54) AIR CONDITIONING SYSTEMS

(75) Inventors: Takashi Ban; Toshiro Fujii; Takanori Okabe; Yoshiyuki Nakane, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/412,018

(22) Filed: Oct. 4, 1999

(30) Foreign Application Priority Data

Oct. 5, 1998 (JP) ................................................ 10-283120

(51) Int. Cl.[7] ...................................................... F25B 49/02
(52) U.S. Cl. .......................................... 62/228.3; 62/228.5
(58) Field of Search ................................ 62/196.4, 196.3, 62/196.1, 228.3, 197, 159, DIG. 17, 228.5

(56) References Cited

U.S. PATENT DOCUMENTS

| 4,880,356 | * | 11/1989 | Suzuki et al. | 417/53 |
| 4,905,477 | * | 3/1990 | Takai | 62/196.3 |
| 4,989,414 | * | 2/1991 | Murayama et al. | 62/228.4 |
| 5,257,507 | * | 11/1993 | Taguchi | 62/133 |
| 5,653,119 | * | 8/1997 | Kimura et al. | 62/228.5 |
| 5,823,000 | * | 10/1998 | Takai | 62/133 |

FOREIGN PATENT DOCUMENTS

| 5-223357 | 8/1993 | (JP) . |
| 7-19630 | 1/1995 | (JP) . |
| 10-47242 | 2/1998 | (JP) . |

* cited by examiner

*Primary Examiner*—Harry B. Tanner
(74) *Attorney, Agent, or Firm*—Morgan & Finnegan, LLP

(57) ABSTRACT

An air conditioning system 100 may include a compressor 101 having a driving chamber 110, a cooling circuit 151, a heating circuit 152 and a controller 189. This system may release high pressure refrigerant from the compressor discharge port 120 into the compressor driving chamber 110 by means of the controller 189. The controller 189 may include a selector 181, a first refrigerant releasing means 183 and a second refrigerant releasing means 185. The selector 181 connects the discharge port 120 and the driving chamber 110 by both the first and second refrigerant releasing means 183, 185 when discharge pressure of the refrigerant has reached a predetermined high-pressure state during operation of the heating circuit 152. When the discharge pressure of the refrigerant results an abnormal high pressure state during the operation of the heating circuit 152, the high pressure refrigerant is released from the discharge port 120 into the driving chamber 110 not only by a single refrigerant releasing means 185 but by double refrigerant releasing means 183, 185. Therefore, the high pressure refrigerant can be swiftly released into the driving chamber 110 to increase the pressure in the driving chamber 110 and the necessary time for reducing the compressor discharge pressure can be minimized. Thus, the abnormal high discharge pressure can be quickly alleviated.

33 Claims, 8 Drawing Sheets

AIR CONDITIONING SYSTEMS

BACKGROUND OF THE INVENTION

1. Technical Field

The present invention relates to air conditioning systems that utilize refrigerants and a compressor, and particularly to air conditioning systems capable of alleviating excessive increases in refrigerant discharge pressure within a heating circuit.

2. Description of the Related Art

A known air conditioning system is disclosed in Japanese Patent Application No.7-19630 and includes a compressor 1, a cooling circuit 51, a heating circuit 52 and a controller 83, as shown in FIG. 1. The cooling circuit 51 includes a condenser 55, a first expansion valve 57 and a heat exchanger 59 provided on a passage connecting a discharge port D to a suction port S of the compressor 1. High temperature and high pressure refrigerant discharged from the discharge port D of the compressor 1 is drawn through the above respective devices and back to the compressor 1.

The heating circuit 52 includes a bypass passage 52a that extends from the discharge port D of the compressor 1 to the heat exchanger 59, a second expansion valve 63 provided within the bypass passage 52a and the heat exchanger 59. The high temperature and high pressure refrigerant discharged from the compressor 1 is not directed to the condenser 55, but rather is drawn by the compressor 1 through the second expansion valve 63 and the heat exchanger 59. Such a heating circuit 52 is generally known as a hot gas bypass heater.

The operation of the cooling circuit 51 and the heating circuit 52 is changeably selected by opening and closing selector valves 53a and 53b, which opening and closing operations are performed by the controller 83.

Because the refrigerant discharge pressure is higher when the heating circuit 52 is used than when the cooling circuit 51 is used, the air conditioning system must operate in a high pressure state when the heating circuit 52 is utilized. An abnormally high-pressure state may be created if the output discharge capacity of the compressor 1 temporarily increases during the operation of the heating circuit 52. A refrigerant releasing passage 91 having a pressure relief valve 93 is provided in order to release excess pressure from heating circuit 52, if an abnormally high pressure state is reached. The refrigerant releasing passage 91 is connected to the heating circuit 52 and the cooling circuit 51 and the pressure relief valve 93 can be opened to release the refrigerant from the heating circuit 52 into the cooling circuit 51 when the refrigerant discharge pressure abnormally increases during the operation of the heating circuit 52.

Another known variable displacement compressor is disclosed in Japanese Patent Application No.10-47242. Although this compressor is not explicitly shown in the drawings, a connecting passage having a capacity control valve is provided between a discharge port and a driving chamber (also known as the crank case) in a housing such that refrigerant is released from the discharge port into the driving chamber when the capacity control valve is opened. The capacity control valve is opened to increase the pressure in the driving chamber when the discharge pressure is high. On the other hand, the capacity control valve is closed to decrease the pressure in the driving chamber when the discharge pressure is low.

The output discharge capacity is decreased when the pressure in the driving chamber is increased, and the output discharge capacity is increased when the pressure in the driving chamber is decreased. The output discharge capacity is decreased to decrease the discharge pressure when the discharge pressure increases, and the output discharge capacity is increased to increase the discharge pressure when the discharge pressure decreases.

If the variable displacement compressor disclosed in Japanese Patent Application No.10-47242 is employed in the air conditioning system having the hot gas bypass heater circuit disclosed in Japanese Patent Application No.7-19630, abnormally high pressure can be alleviated without the insufficiency in the heating performance due to release of the refrigerant in the hot gas bypass heater circuit into the cooling circuit and without low energy sufficiency due to wasteful release of the refrigerant at highly increased pressure by causing the compressor to work.

However, a problem can occur due to a combination of a characteristics of the variable displacement compressor and a characteristics of the hot gas bypass heater by only employing the variable displacement compressor disclosed in Japanese Patent Application No.10-47242 in the air conditioning system having the hot gas bypass heater circuit disclosed in Japanese Patent Application No.7-19630. As described above, because a step of decreasing the opening the capacity control valve of the compressor to increase the pressure in the driving chamber, a step of decreasing the output discharge capacity and a step of decreasing the discharge pressure are necessary to alleviate the abnormal high discharge pressure by utilizing the technique disclosed in Japanese Patent Application No.10-47242.

Therefore, if the discharge pressure increases drastically, the discharge pressure may abnormally be increased and the hot gas bypass heater circuit may be damaged by such abnormal increase in pressure because above-explained steps for decreasing the discharge pressure by decreasing the pressure in the driving chamber of the variable displacement compressor require certain time to be completed.

The technique disclosed in Japanese Patent Application No.10-47242 does not have a hot gas bypass heater circuit and has only the cooling circuit. In such a case, the pressure of the refrigerant flowing through the cooling circuit is inherently lower than the pressure of the refrigerant flowing through the hot gas bypass heater circuit, and the cooling circuit may not be damaged by abnormal increase in pressure.

In other words, the technique disclosed in Japanese Patent Application No.10-47242 is sufficient when the hot gas bypass heater circuit is not employed. However, if the air conditioning system has the hot gas bypass heater circuit, because the pressure of the refrigerant during the operation of the hot gas bypass heater circuit is inherently high, the output discharge capacity control technique of the known variable displacement compressor is insufficient to quickly alleviate the abnormal increase in pressure.

SUMMARY OF THE INVENTION

It is, therefore, an object of the present invention to provide an air conditioning system that can alleviate abnormal high pressure state more quickly.

Preferably, an air conditioning system may include a compressor having a driving chamber, a cooling circuit, a heating circuit and a controller. This system may release high pressure refrigerant from the compressor discharge port into the compressor driving chamber by means of a controller. By increasing the pressure within the driving chamber, the compressor discharge capacity can be reduced, because the compressor stroke length will be decreased. As a result, the pressure within the air conditioning system will be reduced by the reduction in the compressor discharge capacity.

The controller may include a selector, a first refrigerant releasing means and a second refrigerant releasing means. The selector connects the discharge port and the driving chamber by both the first and second refrigerant releasing means when discharge pressure of the refrigerant has reached a predetermined high-pressure state during operation of the heating circuit. This is, when the discharge pressure of the refrigerant results an abnormal high pressure state during the operation of the heating circuit, the high pressure refrigerant is released from the discharge port into the driving chamber not only by a single refrigerant releasing means but by double refrigerant releasing means. Therefore, the high pressure refrigerant can be swiftly released into the driving chamber to increase the pressure in the driving chamber and the necessary time for reducing the compressor discharge pressure can be minimized. Thus, the abnormal high pressure state of the discharged refrigerant can be quickly alleviated.

Other objects, features and advantages of the present invention will be readily understood after reading the following detailed description together with the accompanying drawings and the claims.

DETAILED DESCRIPTION OF THE INVENTION

Figure 1:
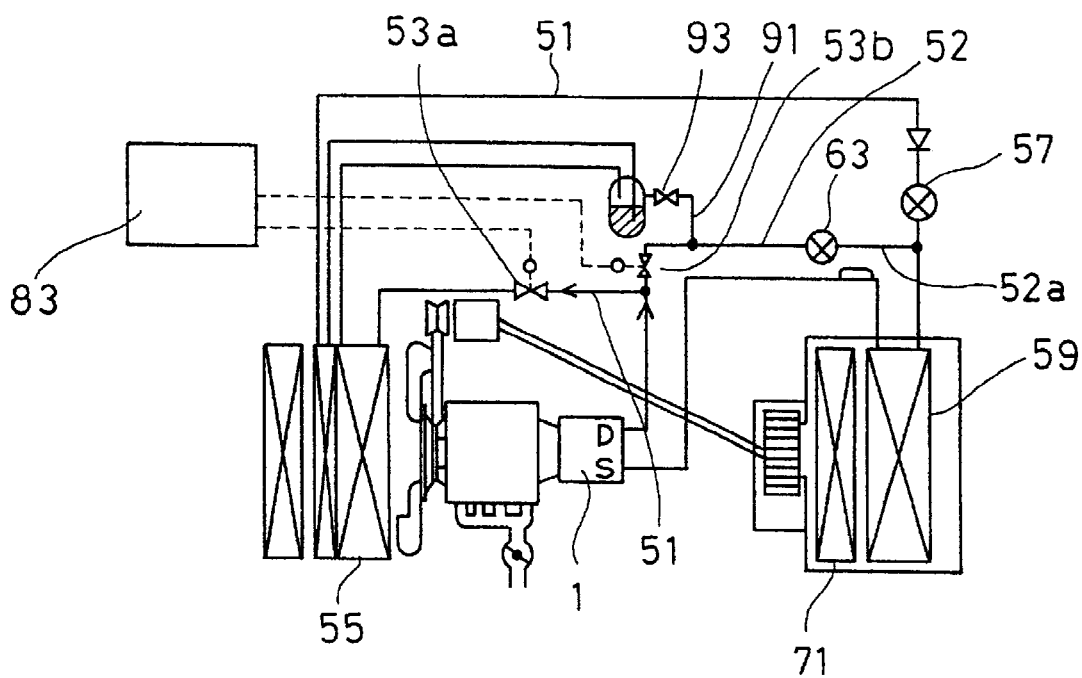
FIG. 1 shows a known air conditioning system.

Preferably, an air conditioning system includes a compressor, a heating circuit and a controller. The compressor may have a driving unit provided in a driving chamber, a suction port for drawing refrigerant into the compressor and a discharge port for discharging high pressure refrigerant from the compressor. The controller decreases the output discharge capacity of the compressor by releasing the refrigerant from the discharge port into the driving chamber. The heating circuit may have a passage that extends from the discharge port to the suction port through the heat exchanger. Such a heating circuit is generally known as a hot gas bypass heater. It is preferable to provide a decompressor such as an expansion valve on the bypass passage that extends from the discharge port to the heat exchanger in the hot gas bypass heater. The controller may have a selector and a first refrigerant releasing means and a second refrigerant releasing means for connecting separately the discharge port and the driving chamber.

The selector may connect the discharge port and the driving chamber by both the first and second refrigerant releasing means when discharge pressure of the refrigerant results a predetermined high-pressure state during operation of the heating circuit.

In this example, the controller may release the high pressure refrigerant from the discharge port into the driving chamber to increase the pressure in the driving chamber. When the pressure in the driving chamber increases, the compressor output discharge capacity decreases. When the pressure in the driving chamber decreases, the compressor output discharge capacity increases. When the output discharge capacity decreases, the discharge pressure of the compressor decreases and the suction pressure of the compressor increases. When the output discharge capacity increases, the discharge pressure increases and the suction pressure decreases.

When the discharge pressure reaches an abnormal high-pressure state during operation of the heating circuit, the heating circuit will be damaged because high pressure is utilized in operating the heating circuit to attain sufficient heating performance and therefore, an upper limit tolerance level for the discharge pressure becomes closer in the heating circuit. Particularly, such an abnormal high pressure of the refrigerant will seriously damage the hot gas bypass heater circuit because the circuit capacity for flowing the refrigerant in the hot gas bypass heater is smaller than the capacity of a general type of heating circuit such as a heat pump. Therefore, the selector may connect the discharge port and the driving chamber by both the first and second refrigerant releasing means when discharge pressure of the refrigerant reaches a predetermined high-pressure state during operation of the heating circuit. This is, the high pressure refrigerant can be quickly released into the driving chamber by using both the first and second refrigerant releasing means and thus, the output discharge capacity of the compressor quickly decreases. As a result, even if the discharge pressure increases rapidly, the abnormal high pressure state of the refrigerant can be quickly alleviated.

The selector may preferably include a valve that can select the first and second refrigerant releasing means for releasing the refrigerant from the discharge port into the driving chamber. In such a case, this valve is, for example, the feature corresponding to the selector as described above, while the interpretation of the term "selector" is not limited within this valve.

The first refrigerant releasing means may preferably include a first valve that is provided on a first passage extending from the discharge port to the driving chamber. In such a case, for example, the first valve and the first passage are the features corresponding to the first refrigerant releasing means as described above, while the interpretation of the term "first refrigerant releasing means" is not limited within the first valve and the first passage. The first valve may open for communicating the first passage when the compressor suction pressure reaches the predetermined low-pressure state during the operation of the cooling circuit. Further, the first valve may open when the compressor discharge pressure results the predetermined high-pressure state during the operation of the heating circuit.

The second refrigerant releasing means may preferably include a second valve that is provided on a second passage extending from the discharge port to the driving chamber. In such a case, for example, the second valve and the second passage are the features corresponding to the second refrigerant releasing means as described above, while the interpretation of the term "second refrigerant releasing means" is not limited within the second valve and the second passage". The second valve may be opened for communicating the second passage when the compressor discharge pressure reaches the predetermined high-pressure state during the operation of the heating circuit. According to such an example, the selector valve may open both the first and second passages so that the refrigerant may be released from the discharge port into the driving chamber through both the first and second passages. Therefore, the abnormal high-pressure state of the compressor discharge pressure during the operation of the heating circuit can be quickly alleviated because of the quick release of the refrigerant from the discharge port into the driving chamber by using two passages.

Moreover, the selector valve may be provided on a passage extending from the discharge port to the first and second valves or the selector valve may be provided on a passage extending from the first and second valve to the driving chamber.

In a second representative example, the first valve is opened at all times during operation of the heating circuit. When the selector valve is opened to communicate both the first and second passages for the alleviation of the abnormal high-pressure state of the discharge pressure during operation of the heating circuit, the refrigerant can be released more quickly because the first valve is already opened when the selector valve communicates the first passage.

Figure 3:
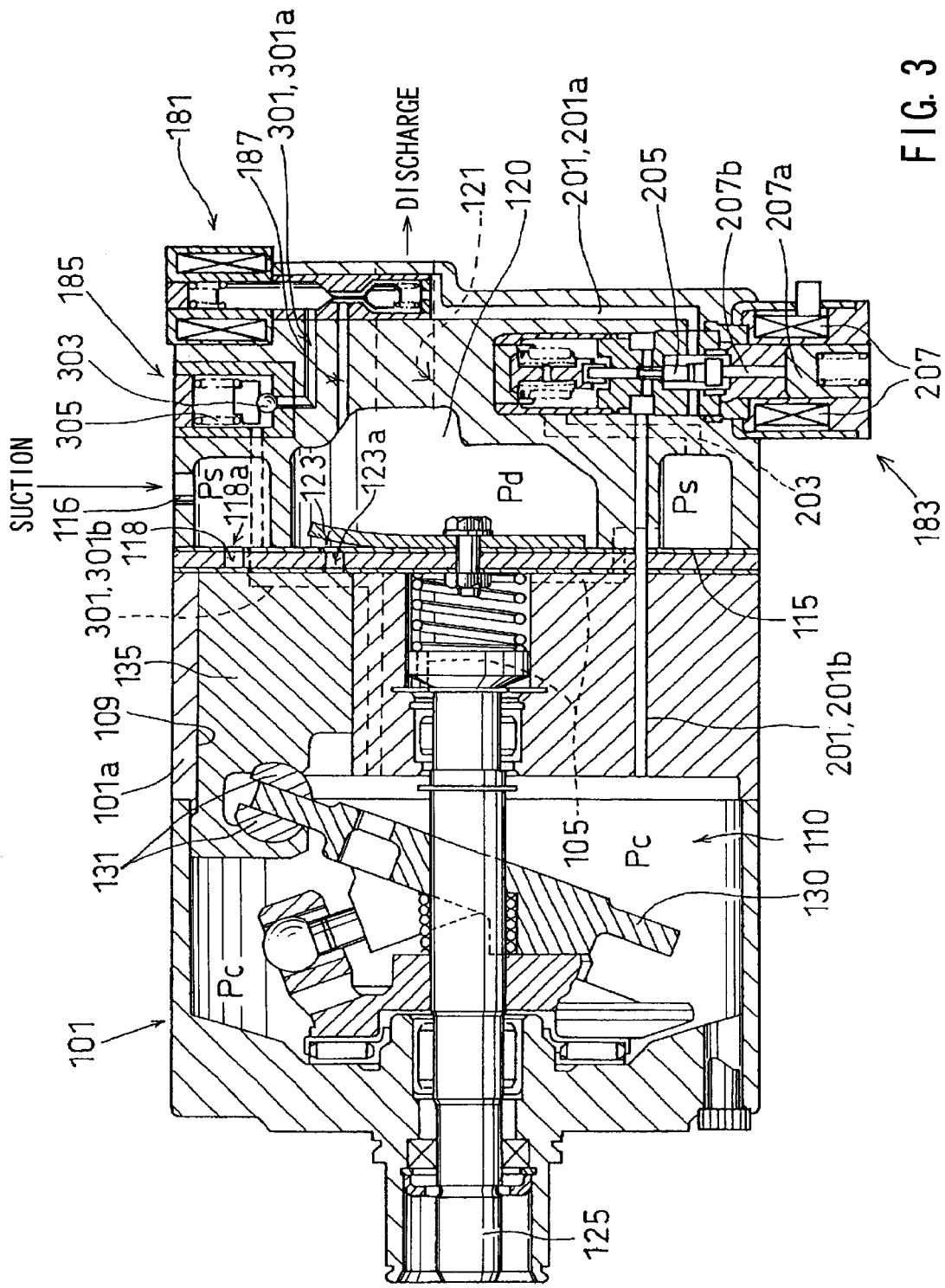
FIG. 3 shows the detailed constructions of a compressor and controller in the air conditioning system according to the first representative embodiment.
Figure 4:
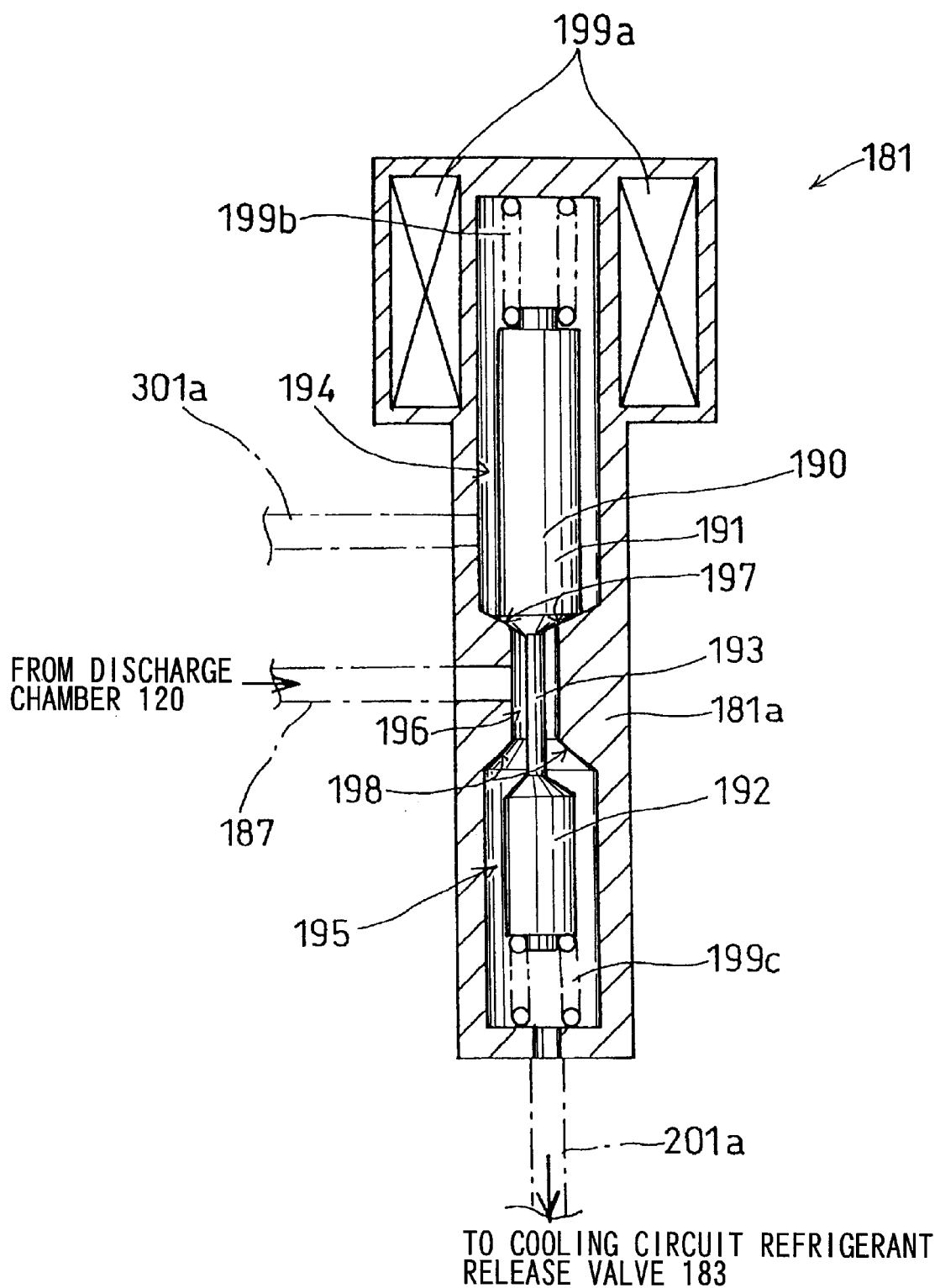
FIGS. 4 to 6 respectively show the detailed constructions of a selector valve.

Each of the additional features and method steps disclosed above and below may be utilized separately or in conjunction with other features and method steps to provide improved air conditioning systems and methods for designing and using such air conditioning systems. Representative examples of the present invention, which examples utilize many of these additional features and method steps in conjunction, will now be described in detail with reference to the drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe some representative examples of the invention, which detailed description will now be given with reference to the accompanying drawings.
First Detailed Representative Embodiment Referring to FIG. 2, the air conditioning system 100 may include a cooling circuit 151, a heating circuit 152 and a variable displacement compressor 101 as a driving source for both the heating and cooling circuits. A representative controller is shown in FIGS. 3 and 4, but is not shown in FIG. 2 for the sake of convenience and will be described below in further detail. Such an air conditioning system 100 may be utilized in a vehicle-mounted air conditioning system. In such case, the compressor driving shaft 125 may be coupled to and driven by an automobile engine 170.

The cooling circuit 151 may be driven by high-pressure refrigerant, which is compressed by the compressor 101, and may include a condenser 155, a first expansion valve 157, a heat exchanger 159 and an accumulator 161. These devices may be disposed within a path 151a that extends from a discharge port D to a suction port S of the compressor 101. The heat exchanger 159 is also generally known as an evaporator. The heat exchanger 159 may be arranged side by side with a hot-water heater 171, which circulates hot coolant from the engine 170 through a pipe 173.

The heating circuit 152 may be driven by high-temperature and high-pressure refrigerant, which is also compressed by the compressor 101, and may include a second expansion valve 163, the heat exchanger 159 and the accumulator 161. These devices are disposed on a bypass passage 152a for introducing the refrigerant discharged from the discharge port D to the heat exchanger 159. In other words, the heating circuit 152 partially overlaps with the cooling circuit 151. Such a heating circuit 152 is also generally known as a hot-gas bypass heater.

Figure 2:
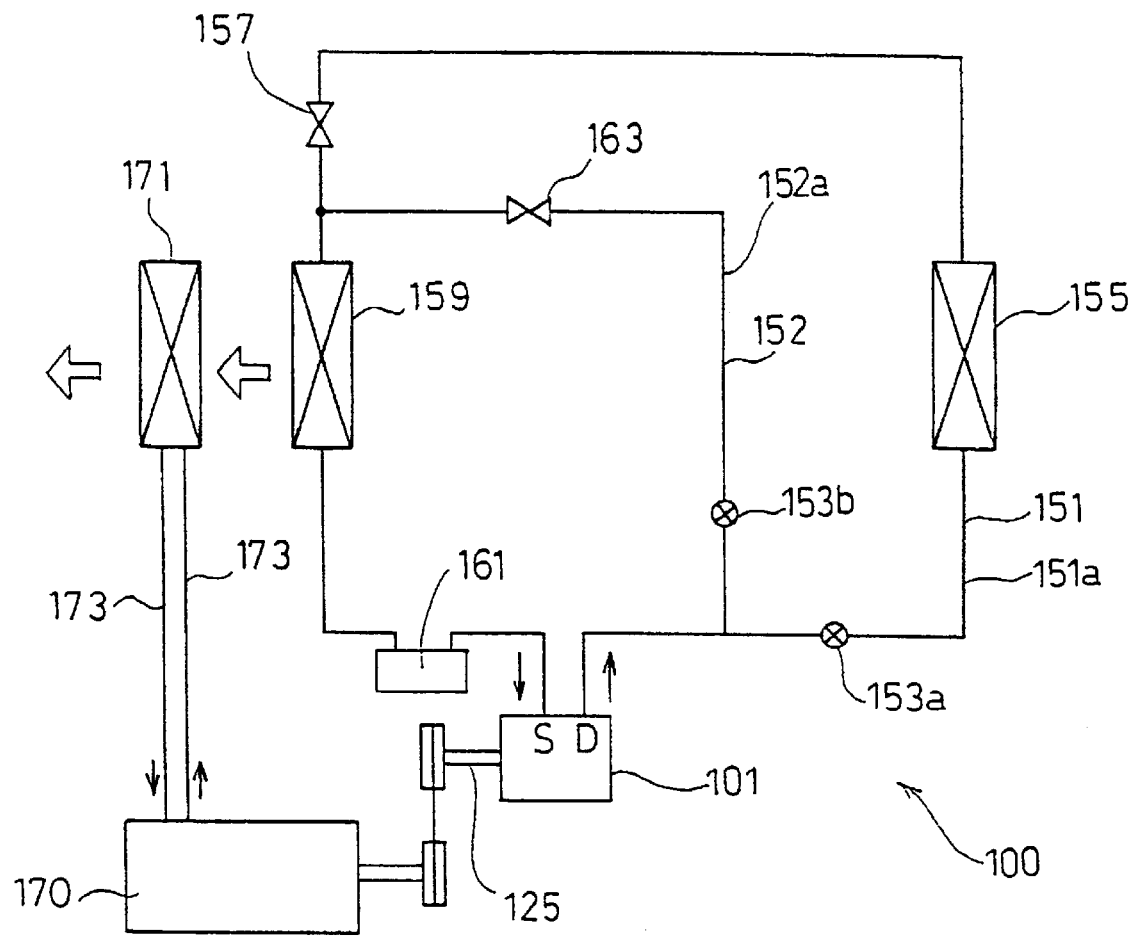
FIG. 2 shows an air conditioning system according to a first representative embodiment.

In FIG. 2, a first open/close valve 153a and a second open/close valve 153b may be utilized as switch valves for alternatively actuating the cooling circuit 151 and the heating circuit 152.

During operation of the cooling circuit 151, the refrigerant is compressed by the compressor 101 to attain a high temperature and high pressure state. This compressed refrigerant is sent to the condenser 155, where heat from the high-temperature refrigerant is dissipated to the outside environment and the refrigerant is liquefied. The refrigerant is decompressed by the first expansion valve 157 and sent to the heat exchanger 159 where the refrigerant absorbs outside heat and is gasified. The gasified refrigerant is returned to the compressor 101 again through the accumulator 161 for re-circulation throughout the system 100.

During operation of the heating circuit 152, the refrigerant is compressed by the compressor 101 to attain a high temperature and high pressure state. The compressed refrigerant is then decompressed by the second expansion valve 163 and sent to the heat exchanger 159, where heat from the compressed refrigerant is dissipated to the outside environment. In the heating circuit cycle, the refrigerant is constantly in a gaseous state while circulating through the heating circuit 152.

The heating circuit 152 may be used as an auxiliary heater. Heat generated by the heat exchanger 159 during operation of the heating circuit 152 may be used as an auxiliary heating source for the hot water heater 171. The heating circuit 152 also may be used to assist the coolant from the engine 170 when the coolant can not provide sufficient heat to start the engine 170 in a low-temperature environment, such as an outside air temperature of –20° C. or so.

Referring to FIG. 3, a representative compressor 101 is shown that may include a driving chamber 110 defined within a housing 101a of the compressor 101 and a swash plate 130 that is rotatably supported by the driving shaft 125 in the driving chamber 110. The swash plate 130 may be supported by the driving shaft 125 and may rotate together with the drive shaft 125. The swash plate 130 is inclined with respect to the driving shaft 125 when the driving shaft 125 rotates and the inclination angle of the swash plate 130 with respect to a plane perpendicular to the axis of rotation of the driving shaft 125 is changeable.

The peripheral edge portion of the swash plate 130 may be connected to the base portions of the pistons 135 by means of movable shoes 131. Six pistons 135 in total may be disposed around the driving shaft 125 (however, only one piston is shown in FIG. 3 for the sake of convenience) and may be laterally slide within six cylinder bores 109. The circumferential positions of the six cylinder bores 109 fixed by the compressor housing 101a.

When the swash plate 130 rotates together with the driving shaft 125 while being inclined as shown in FIG. 3, the peripheral edge of the swash plate 130 slides with respect to the piston 135 fixed in the circumferential direction. When the peripheral edge of the swash plate 130 being inclined to a position closest to the cylinder bores 109 (as shown in FIG. 3), the piston 135 reaches its deepest insertion into the cylinder bores 109. When the peripheral edge of the swash plate 130 (the peripheral edge shown in a lower part of FIG. 3) being inclined to a position furthest away from the cylinder bores 109, the piston 135 is substantially withdrawn from the cylinder bore 109. Each 360° rotation of the driving shaft 125 results in each piston 135 laterally reciprocating one time.

A suction port 118a and a discharge port 123a are defined in a bottom portion of each the cylinder bore 109. A suction valve 118 is positioned to correspond to the suction port 118a and a discharge valve 123 is positioned to correspond to the discharge port 123a. Each suction port 118a communicates with a suction chamber 115 and each the discharge port 123a communicates with a discharge chamber 120.

When the piston 135 moves to the left in FIG. 3, as a result of rotation of the swash plate 130, refrigerant is introduced from the suction opening 116 through the suction chamber 115, suction port 118a and suction valve 118 into the cylinder bore 109. When the piston 135 moves to the right in FIG. 3, as a result of further rotation of the swash plate 130, the refrigerant is compressed into a high-pressure state and discharged from a discharge opening 121 through the discharge port 123a, discharge valve 123 and discharge chamber 120.

The output discharge capacity of the compressor 101 is determined by the stroke length of the piston 135, which is determined by the degree of change in inclination angle of the swash plate 130 during each cycle. That is, the further the swash plate 130 is withdrawn from the cylinder bore 109 during each cycle, the longer the stroke length of the piston 135 will be. As the stroke length increases, the output discharge capacity of the compressor 101 also increases.

The inclination angle of the swash plate 130 is determined, in part, by the difference in pressure on the opposite sides of the piston 135, i.e., the pressure difference between driving chamber pressure and the cylinder bore pressure. Increasing or decreasing the driving chamber pressure can adjust this pressure difference.

The driving chamber 110 is connected to the suction chamber 115 through the bleeding passage 105. Although it is not particularly shown in FIG. 3, a throttle is provided in the bleeding passage 105.

Thus, in order to decrease the output discharge capacity, the high-pressure refrigerant is released from the discharge chamber 120 into the driving chamber 110. Due to resulting increase in the driving chamber pressure, the swash plate 130 stands and the stroke length of the piston 135 decreases. Therefore, the output discharge capacity also will decrease. On the other hand, in order to increase the output discharge capacity, the refrigerant in the discharge chamber 120 is prevented from being released into the driving chamber 110. As a result, the driving chamber pressure will gradually decrease, the swash plate 130 will move further in the lateral direction and the stroke length of the piston 135 will increase. In this case, the output discharge capacity will increase.

A controller is provided for releasing the high-pressure refrigerant from the discharge chamber 120 into the driving chamber 110. The controller may include a selector valve 181, a cooling circuit refrigerant release valve 183, a heating circuit refrigerant release valve 185, a selector valve guide passage 187, cooling circuit refrigerant release passages 201, heating circuit refrigerant release passages 301 and a bleeding passage 105 connecting the driving chamber 110 to the suction chamber 115.

The selector valve 181 communicates with the discharge chamber 120 through the selector valve guide passage 187, with the cooling circuit refrigerant release valve 183 through the first cooling circuit refrigerant release passage 201a, and with the heating circuit refrigerant release valve 185 through the first heating circuit refrigerant release passage 301a.

The cooling circuit refrigerant release valve 183 further communicates with the driving chamber 110 through the second cooling circuit refrigerant release passage 201b. The cooling circuit refrigerant release valve 183 detects suction pressure Ps in the suction chamber 115 through a suction pressure detecting passage 203. The cooling circuit refrigerant release valve 183 may include a valve body 205 that is opened/closed by exciting/not exciting a solenoid 207. When the cooling circuit refrigerant release valve 183 opens, the first cooling circuit refrigerant release passage 201a communicates with the second cooling circuit refrigerant release passage 201b. The solenoid 207 is excited by a control signal of controller (not shown in FIG. 3).

The heating circuit refrigerant release valve 185 further communicates with the driving chamber 110 through the second heating circuit refrigerant release passage 301b. The heating circuit refrigerant release valve 185 may include a valve body 303 that biased downward in FIG. 3 by a spring 305. The valve body 303 is a differential pressure valve that is opened by a difference between pressure in the first heating circuit refrigerant release passage 301a and pressure in the second heating circuit refrigerant release passage 302b.

The selector valve 181 is shown in detail in FIG. 4. The selector valve 181 is provided with a selector valve body 190 that is actuated by a solenoid 199a.

The selector valve 181 may include a housing 181a, in which a first chamber 194, a second chamber 195 and a connecting passage 196 for connecting both the chambers are provided. A discharge chamber 120 shown in FIG. 3 communicates with the connecting passage 196 through the selector valve guide passage 187. The heating circuit refrigerant release valve 185 shown in FIG. 3 communicates with the first chamber 194 through the heating circuit refrigerant release passage 301a. The cooling circuit refrigerant release valve 183 shown in FIG. 3 communicates with the second chamber 195 through the cooling circuit refrigerant release passage 201a.

The selector valve body 190 may include a first valve body 191, a second valve body 192 and a connecting member 193 for integrally connecting both the valves. The first valve body 191 is provided in the first chamber 194 in the housing 181a, and the second valve body 192 is provided in the second chamber 195 in the housing 181a. The connecting member 193 is provided in the connecting passage 196 that connect the first chamber 195 with the second chamber 195. The selector valve body 190 is movable in a vertical direction in FIG. 4 by exciting/not exciting the solenoid 199a while receiving biasing forces of a spring 199b and a spring 199c. The selector valve 181 is operated based upon the control signal of the controller 189 shown in FIG. 7.

In FIG. 4, the selector valve body 190 is moved to a lower position. In this state, the first valve body 191 contacts the first valve seat 197 such that the first chamber 194 does not communicate with the second chamber 195. Therefore, the discharge chamber 120 shown in FIG. 3 communicates with the second chamber 195 through the connecting passage 196 and does not communicate with the first chamber 194. As a result, the discharge chamber 120 shown in FIG. 3 only communicates with the cooling circuit refrigerant release valve 183 through the selector valve guide passage 187, the second chamber 195 in the selector valve 181 and the first cooling circuit refrigerant release passage 201a.

Figure 5:
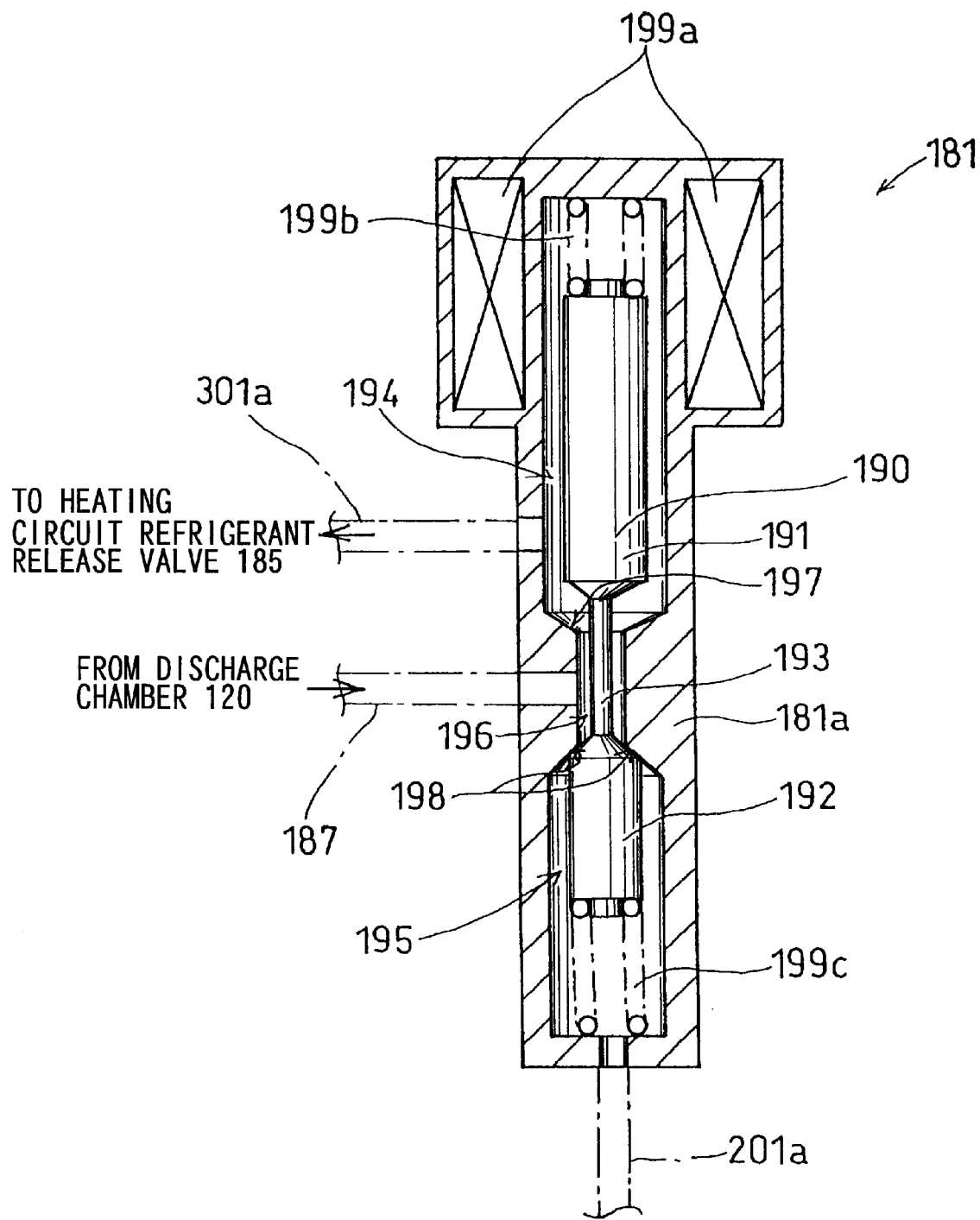

In FIG. 5, the selector valve body 190 is moved to an upper position. In this state, the second valve body 192 contacts the second valve seat 198 such that the first chamber 194 does not communicate with the second chamber 195. Therefore, the discharge chamber 120 shown in FIG. 3 communicates with the first chamber 194 through the connecting passage 196 and does not communicate with the second chamber 195. As a result, the discharge chamber 120 shown in FIG. 3 communicates with the heating circuit refrigerant release valve 185 through the selector valve guide passage 187, the first chamber 194 in the selector valve 181, and the first heating circuit refrigerant release passage 301a.

Figure 6:
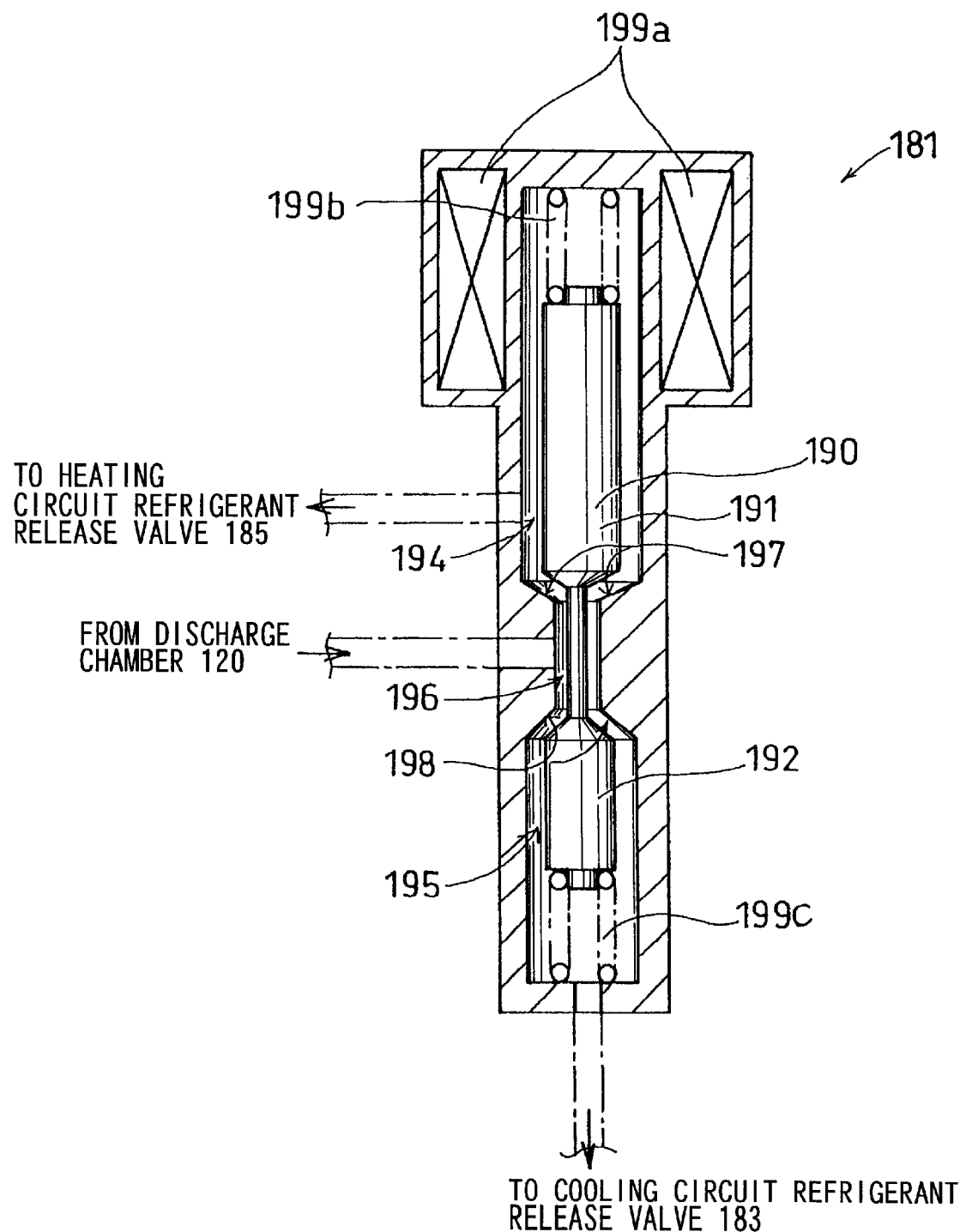

In FIG. 6, the selector valve 190 is moved to an intermediate position. In this state, the first valve body 191 and the second valve body 192 do not contact the first valve seat 197 and the second valve seat 198. As a result, the first chamber 194 communicates with the second chamber 195. Therefore, the discharge chamber 120 shown in FIG. 3 communicates with the first chamber 194 and the second chamber 195 through the connecting passage 196. As a result, the discharge chamber 120 shown in FIG. 3 communicates with the cooling circuit refrigerant release valve 183 through the selector valve guide passage 187, the second chamber 195 in the selector valve 181 and the first cooling circuit refrigerant release passage 201a, while the discharge chamber 120 communicates with the heating circuit refrigerant release valve 185 through the selector valve guide passage 187, the first chamber 194 in the selector valve 181, and the first heating circuit refrigerant release passage 301a. The above-explained structure is schematically shown in FIG. 7.

During operation of the cooling circuit 151, the selector valve body 190 is moved to a lower position as shown in FIG. 4 and the discharge chamber 120 communicates with the cooling circuit refrigerant release valve 183 while the discharge chamber 120 does not communicate with the heating circuit refrigerant release valve 185. As shown in FIG. 7, the refrigerant in the discharge chamber 120 is sent to the cooling circuit refrigerant release valve 183 through the selector valve guide passage 187, the selector valve 181 and the first cooling circuit refrigerant release passage 201a.

The controller 189 detects the suction pressure Ps value of the compressor and transmits the control signal to open or to close the cooling circuit refrigerant release valve 183 based upon the detected Ps value. When the suction pressure Ps is in a predetermined low-pressure state, i.e., the suction pressure Ps is abnormally low, during operation of the cooling circuit 151, the cooling circuit refrigerant release valve 183 is opened to release the refrigerant from the discharge chamber 120 into the driving chamber 110 through the first and second cooling circuit refrigerant release passages 201a, 201b. Thus, the pressure in the driving chamber 110 increases, the output discharge capacity of the compressor 101 decreases and the suction pressure Ps increases. As a result, the heat exchanger 159 (see FIG. 2) can be prevented from being frosted. When the suction pressure Ps is not in a predetermined low-pressure state, i.e., the suction pressure Ps is not excessively low, the cooling circuit refrigerant release valve 183 is kept to be closed. As described above, because the selector valve 181 does not connect the discharge chamber 120 with the heating circuit refrigerant release valve 185 during operation of the cooling circuit 151, the refrigerant is not sent to the heating refrigerant release valve 185.

Figure 7:
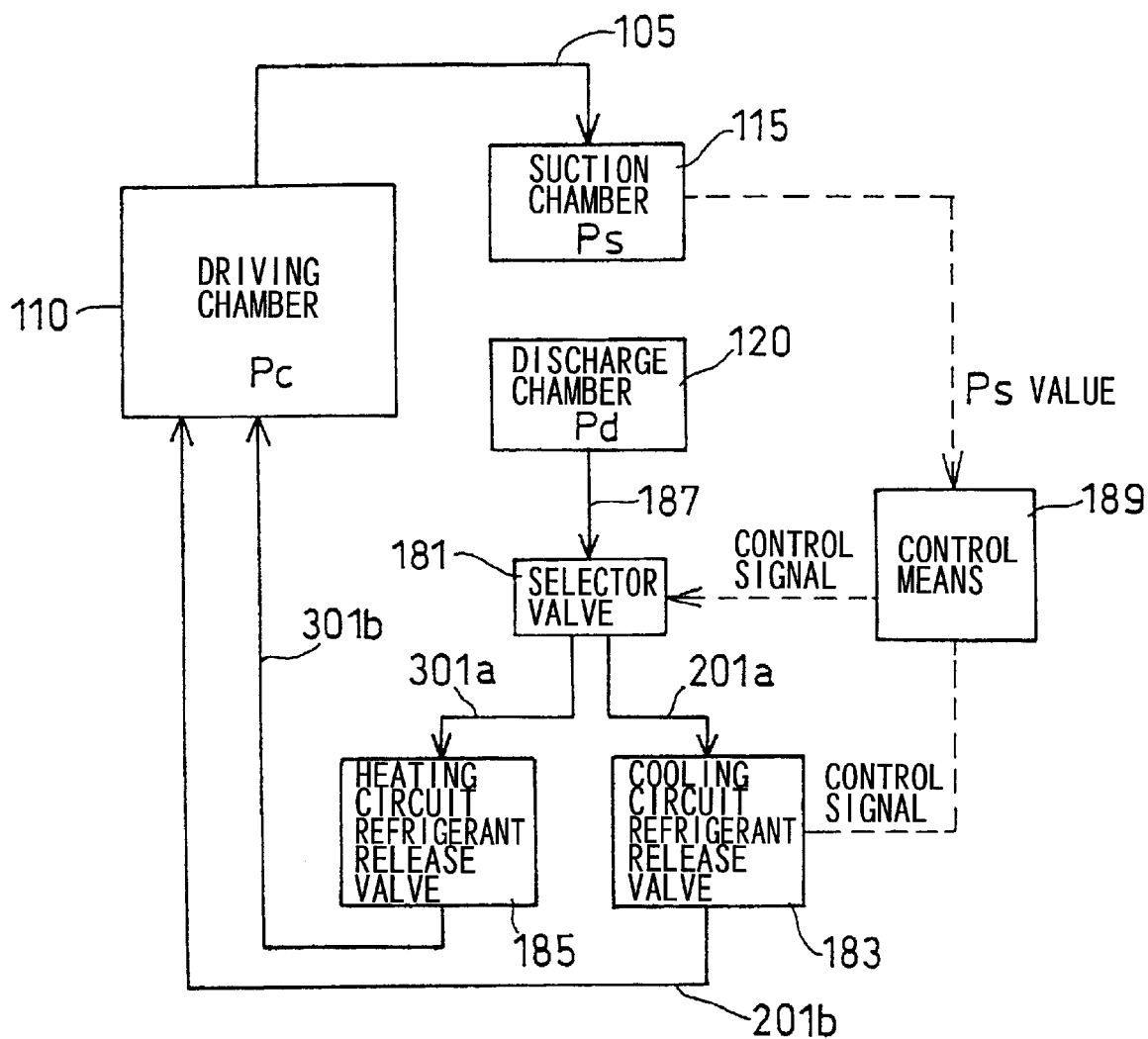
FIG. 7 shows the schematic construction of the controller.

During operation of the heating circuit 152, the cooling refrigerant release valve 183 is opened at all times by the control signal of the controller 189 shown in FIG. 7. When the discharge pressure Pd of the refrigerant is not in a predetermined high-pressure state, i.e., the discharge pressure Pd is not abnormally high, during operation of the heating circuit 152, the selector valve 181 connects the discharge chamber 120 with the heating circuit refrigerant release valve 185 and does not connect the discharge chamber 120 with the cooling circuit refrigerant release valve 183 as shown in FIG. 5. The selector valve 181 is operated based upon the control signal of the controller 189 shown in FIG. 7. Therefore, as shown in FIG. 7, the refrigerant in the discharge chamber 120 is sent to the heating refrigerant release valve 185 through the selector valve guide passage 187, the selector valve 181 and the first heating circuit refrigerant release passage 301a. As described above, a differential pressure valve is utilized for the heating circuit refrigerant release valve 185. The heating circuit refrigerant release valve 185 is opened by the difference between the pressure in the first heating circuit refrigerant release passage 301a and the pressure in the second heating circuit refrigerant release passage 301b. Because the pressure in the first heating circuit refrigerant release passage 301a is equal to the discharge pressure Pd, and the pressure in the second heating circuit refrigerant release passage 301b is equal to the pressure Pc in the driving chamber 110, the heating circuit refrigerant release valve 185 opens when the difference between the discharge pressure Pd and the pressure in the driving chamber 110 reaches a predetermined value and closes when the difference does not reach the predetermined value. The condition for opening the heating circuit refrigerant release valve 185 may be determined by adjusting the biasing force of the spring 305 shown in FIG. 3. The difference between the discharge pressure Pd and the pressure Pc in the driving chamber 110 does not increase to open the heating circuit refrigerant release valve 185 when the discharge pressure Pd is not in the predetermined high-pressure state. Therefore, the discharge chamber 120 is not connected to the driving chamber 110 and the refrigerant in the discharge chamber 120 is not released into the driving chamber 110 when the discharge pressure Pd is not abnormally high. Although the cooling circuit refrigerant release valve 183 is opened in such a case, the refrigerant is not released into the driving chamber 110 by the cooling circuit refrigerant release valve 183 because the selector valve 181 does not communicate the discharge chamber 120 with the cooling circuit refrigerant release valve 183.

When the discharge pressure Pd reaches the abnormally high-pressure state during operation of the heating circuit 152, the selector valve body 190 connects both the first chamber 194 and the second chamber 195 with the discharge chamber 120 as shown in FIG. 6. Thus, the discharge chamber 120 is connected to both the heating circuit refrigerant release valve 185 and the cooling circuit refrigerant release valve 183.

On the contrary, when the discharge pressure Pd reaches the predetermined high-pressure state during operation of the heating circuit 152, the heating circuit refrigerant release valve 185 is opened by the difference between the discharge pressure Pd and the pressure Pc because the discharge pressure Pd increases with respect to the pressure Pc in the driving chamber 110. As a result, the refrigerant is released from the discharge chamber 120 into the driving chamber 110 through the selector valve 181, the first heating circuit refrigerant release passage 301a, the heating circuit refrigerant release valve 185 and the second heating circuit refrigerant release passage 301b. Further, as described above, because the cooling circuit refrigerant release valve 183 is opened at all times during operation of the heating circuit 152, the refrigerant is also released from the discharge chamber 120 into the driving chamber 110 through the selector valve 181, the first cooling circuit refrigerant release passage 201a, the cooling circuit refrigerant release valve 183 and the second cooling circuit refrigerant release passage 201b.

This is, when the discharge pressure Pd of the refrigerant reaches a predetermined high-pressure state during operation of the heating circuit 152, not only the heating circuit refrigerant release passage 301 but also the cooling circuit refrigerant release passage 201 is utilized for releasing the refrigerant from the discharge chamber 120 into the driving chamber 110. Therefore, the abnormal high pressure refrigerant can be quickly released from the discharge port 120 into the driving chamber 110 by utilizing two passages. Further, because the cooling circuit refrigerant release valve 183 is opened at all times during operation of the heating circuit, the refrigerant can immediately be released from the discharge port 120 into the driving chamber 110 for alleviating the abnormally high discharge pressure through the cooling circuit refrigerant release valve 183 by only changing the selector valve 181 from the state shown in FIG. 5 to the state shown in FIG. 6.

As a result of releasing the refrigerant from the discharge chamber 120 into the driving chamber 110, the pressure Pc in the driving chamber increases, the swash plate 130 shown in FIG. 3 stands (the inclination angle decreases), the piston stroke decreases, and the output discharge capacity decreases. Thus, the discharge pressure Pd of the refrigerant decreases and the abnormally high-pressure state of the discharge pressure Pd can be alleviated. As described above, because the refrigerant is released quickly through the two passages, the abnormally high discharge pressure Pd can quickly be alleviated even if the discharge pressure Pd increases relatively sharply in a short time during operation of the heating circuit.

In this embodiment, energy efficiency is slightly decreased because the compressor 101 releases the compressed refrigerant into the driving chamber 110. However, the output discharge capacity of the compressor 101 is decreased by a small release amount of the refrigerant. Therefore, the loss of energy efficiency for alleviating the abnormal high discharge pressure can be minimized The refrigerant released into the driving chamber 110 is drawn into the cylinder bores 109 through the bleeding passage 105, the suction chamber 115, the suction port 118a and the suction valve 118 and then re-compressed and discharged through the discharge port 123a, the discharge valve 123, the discharge chamber 120 and the discharge opening 121.

According to this embodiment, a problem of shortage of heating performance due to release of the refrigerant in the heating circuit into the cooling circuit does not occur.

Moreover, because not only the heating circuit refrigerant release valve 185 but also the cooling circuit refrigerant release valve 183 may be utilized for releasing the refrigerant from the discharge port 120 into the driving chamber 110 by operating the selector valve 181, the refrigerant can quickly be released for alleviating the abnormal high discharge pressure during operation of the heating circuit 152.

Second Detailed Representative Embodiment

Figure 8:
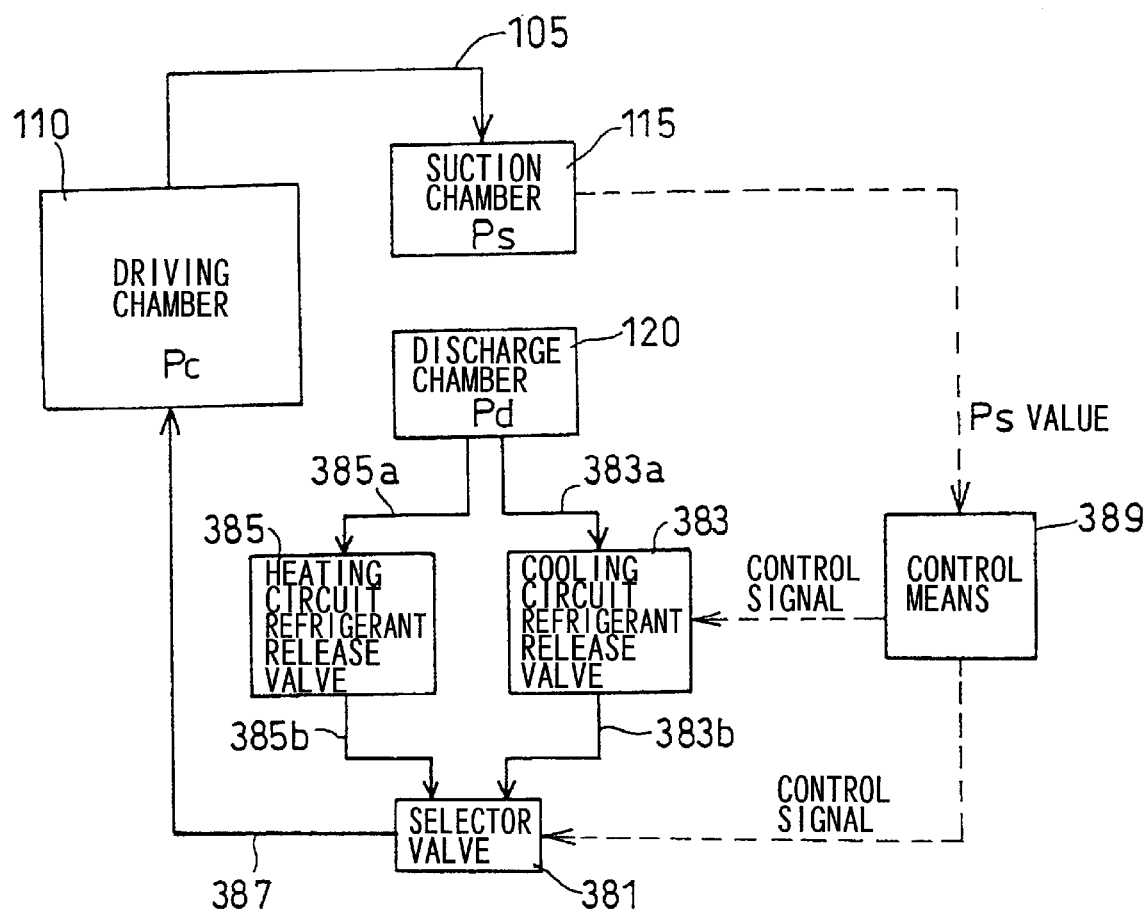
FIG. 8 shows the schematic construction of the controller according to the second representative embodiment.

In the second representative embodiment, the selector valve 381 is provided downstream the cooling circuit refrigerant release valve 385 and the heating circuit refrigerant release valve 383 as shown in FIG. 8. Because structures of the respective devices are the same as those described in the first embodiment, detailed description thereof will be omitted.

Referring to FIG. 8, the refrigerant in the discharge chamber 120 is sent to the cooling circuit refrigerant release valve 383 through the first cooling circuit refrigerant release passage 383a and also sent to the heating circuit refrigerant release valve 385 through the first heating circuit refrigerant releasing passage 385a during the operation of both the cooling circuit and heating circuit.

When the suction pressure Ps value is in an abnormally low-pressure state during operation of the cooling circuit, the cooling circuit refrigerant release valve 383 is opened by the control signal from the controller 389. The selector valve 381 connects the second cooling circuit refrigerant release passage 383b with the selector valve guide passage 387, while the selector valve 381 does not connect the second heating circuit refrigerant release passage 385b with the selector valve guide passage 387. Therefore, when the suction pressure Ps is in the abnormally low-pressure state during operation of the cooling circuit, the refrigerant in the discharge chamber 120 is released into the driving chamber 110 through the first cooling circuit refrigerant release passage 383a, the cooling circuit refrigerant release valve 383, the second cooling circuit refrigerant release passage 383b, the selector valve 381 and the selector valve guide passage 387.

During operation of the heating circuit, the cooling circuit refrigerant release valve 383 is kept to be opened at all times. When the discharge pressure Pd is not in the abnormally high-pressure state during operation of the heating circuit, the selector valve 381 connects the second heating circuit refrigerant release passage 385b with the selector valve guide passage 387, while the selector valve 381 does not connect the second cooling circuit refrigerant release passage 383b with the selector valve guide passage 387. The difference between the discharge pressure Pd and the pressure Pc in the driving chamber 110 does not reach the value to open the heating circuit refrigerant release valve 385. Therefore, the refrigerant is not released from the discharge chamber 120 into the driving chamber 110 when the discharge pressure Pd is not in the abnormally high-pressure state during operation of the heating circuit.

On the other hand, when the discharge pressure Pd is in the abnormally high-pressure state during operation of the heating circuit, the selector valve 381 connects the second heating circuit refrigerant release passage 385b with the selector valve guide passage 387 and also connects the first cooling circuit refrigerant release passage 383b with the selector valve guide passage 387. In this case, because the discharge pressure Pd becomes high with respect to the pressure Pc in the driving chamber 110 enough to open the heating circuit refrigerant release valve 385. Thus, the heating refrigerant release valve 385 is opened by the difference between the discharge pressure Pd and the pressure Pc in the driving chamber 110. As described above, the cooling refrigerant release valve 383 is opened at all times during operation of the heating circuit. Therefore, the refrigerant is released from the discharge chamber 120 into the driving chamber 110 through the two passages, i.e., the heating circuit refrigerant release passage 385a, 385b and the cooling circuit refrigerant release passage 383a, 383b.

Third Detailed Representative Embodiment

In this representative embodiment, the cooling circuit refrigerant release valve 183 is opened based on a value related to change in the discharge pressure. Preferably, a one-time (discharge pressure increasing speed) or a multiple-time differential value such as a two-time differential value (discharge pressure increasing acceleration) can be utilized.

It is determined that the discharge pressure will not increase drastically when, for example, the discharge pressure increasing speed (one-time differential value of the discharge pressure) does not exceed the predetermined value. And it is determined that the discharge pressure will increase drastically when the discharge pressure increasing speed exceeds the predetermined value. Therefore, it is possible to control the opening degree of the cooling circuit refrigerant release valve in response to the discharge pressure increasing speed.

In above-described embodiments, the selector valve, the cooling circuit refrigerant release valve and the heating circuit refrigerant release valve are disposed within the housing of the compressor. However, these devices can be provided outside the compressor in part or in whole. Further, a one-sided swash plate type of compressor, i.e., a compressor having pistons 171 disposed on only one side of the swash plate 161 in FIG. 3, is utilized as the variable displacement compressor in above-described representative embodiments. However, a double-ended piston type can also be utilized in the variable displacement compressor, in which pistons are connected to opposite sides of the swash plate for reciprocation. Further, although the cooling circuit refrigerant release valve is the solenoid valve that is opened by the solenoid and the heating circuit refrigerant release valve is the differential pressure valve that is opened by the difference between the two pressure, both the valves may be the solenoid valves or may be the differential pressure valves. In such a case, the differential pressure valve may utilize the discharge pressure Pd as the high-pressure side and may utilize the suction pressure Ps, the driving chamber pressure Pc, a vacuum pressure or an atmospheric pressure as the low-side pressure. Further, although the air conditioning system was described as having both a cooling circuit and a heating circuit in the representative embodiments, the cooling circuit may be removed, because the present teachings are preferably utilized to alleviate high pressure state within the heating circuit.

Further, although it is not particularly shown in the drawings, following features may be preferably employed to any of the representative embodiments.

First, driving chamber decompression means that releases the refrigerant from the driving chamber 111 in FIG. 3 into the suction area (suction chamber 118, suction port 118a or suction opening 116) separately from the bleeding passage 105 when the driving chamber 110 is brought into a predetermined high-pressure state. The driving chamber decompression means may preferably have a passage extending from the driving chamber 110 to the suction area and a driving chamber decompression valve provided on the passage. The driving chamber decompression valve is opened when the driving chamber is brought into the predetermined high-pressure state in order to release the high-pressure refrigerant from the driving chamber 110 to the suction area to thereby prevent the airtight seal of the driving chamber 110 from being degraded.

Second, means for releasing the refrigerant directly from the discharge area (discharge chamber 120 or discharge opening 121) into the suction area may preferably be provided. The refrigerant releasing means may preferably have a passage extending from the discharge area to the suction area and a refrigerant releasing valve provided on the passage. The refrigerant releasing valve is opened when the discharge pressure is extremely increased such that the normal control by decreasing the compressor discharge capacity can not alleviate the extreme increase in the discharge pressure. Therefore, such means can be utilized as an emergent releasing means for decreasing the abnormal high-pressure state of the refrigerant.

What is claimed is:

1. An air conditioning system comprising:
   a compressor defining a driving chamber, a suction port, and a discharge port, wherein compressed refrigerant may be released from the discharge port into the driving chamber to decrease the compressor output discharge capacity,
   a heating circuit comprising a heat exchanger and a passage extending from the discharge port to the suction port, through the heat exchanger, and
   a controller comprising a selector, a first refrigerant releasing means and a second refrigerant releasing means, the controller decreasing the compressor output discharge capacity by releasing the refrigerant from the discharge port into the driving chamber, wherein the first and second refrigerant releasing means each separately connect the discharge port to the driving chamber, and
   wherein the selector connects the discharge port to the driving chamber by both the first and second refrigerant releasing means when the compressor discharge pressure reaches a predetermined high-pressure state during the operation of the heating circuit.

2. An air conditioning system according claim 1, further comprising:
   a cooling circuit comprising a condenser a second passage extending from the discharge port to the suction port, through the condenser, wherein the heat exchanger is downstream from the condenser, and
   wherein the selector connects the discharge port to the driving chamber only by the first refrigerant releasing means when the compressor suction pressure reaches a predetermined low-pressure state during the operation of the cooling circuit.

3. An air conditioning system according to claim 1, wherein the compressor further comprises:
   a swash plate and a driving shaft disposed within the driving chamber, the swash plate being connected to the driving shaft within the driving chamber for rotation with the driving shaft at an inclination angle with respect to a plane perpendicular to the driving shaft, and
   wherein the compressor further defines a cylinder bore, the compresor further comprising a shoe and a piston, the piston disposed in, the cylinder bore, wherein an end portion of the piston is connected to a peripheral edge of the swash plate by means of the shoe, the piston reciprocating in the cylinder bore to compress the refrigerant in response to rotation of the swash plate in the driving chamber.

4. An air conditioning system according to claim 2, wherein the first refrigerant releasing means comprises a first valve provided on a first passage extending from the discharge port to the driving chamber and the first valve opens when the compressor suction pressure reaches the predetermined low-pressure state during the operation of the cooling circuit and when the compressor discharge pressure reaches the predetermined high-pressure state during the operation of the heating circuit,
   and wherein the second refrigerant releasing means comprises a second valve provided on a second passage extending from the discharge port to the driving chamber and the second valve opens when the compressor discharge pressure reaches the predetermined high-pressure state during the operation of the heating circuit.

5. An air conditioning system according to claim 4, wherein the first valve is opened in accordance with a value related to a change in the discharge pressure when the discharge pressure reaches the predetermined high-pressure state during the operation of the heating circuit.

6. An air conditioning system according to claim 4, wherein the first valve is opened all the time during the operation of the heating circuit.

7. An air conditioning system according to claim 4, wherein the selector comprises a selector valve provided on a passage extending from the discharge port to the first and second valves and the selector valve opens the first passage when the suction pressure reaches the predetermined low-pressure state during the operation of the cooling circuit and the selector valve opens both the first and second passages when the discharge pressure reaches the predetermined high-pressure state during the operation of the heating circuit.

8. An air conditioning system according to claim 4, wherein the selector comprises a selector valve provided on a passage extending from the first and second valve to the driving chamber and the selector valve opens the first passage when the suction pressure reaches the predetermined low-pressure state during the operation of the cooling circuit and the selector valve opens both the first and second passages when the discharge pressure reaches the predetermined high-pressure state during the operation of the heating circuit.

9. An air conditioning system according to claim 4, wherein at least one of the first and second valves opens in response to an outside signal.

10. An air conditioning system according to claim 4, wherein at least one of the first and second valves is opened by a difference between the discharge pressure and a pressure in the driving chamber, by a difference between the discharge pressure and a vacuum pressure or atmospheric pressure, or by a difference between the discharge pressure and the suction pressure.

11. An air conditioning system according to claim 1, wherein the compressor further comprises a housing and all or a part of the selector and the first and second refrigerant releasing means are provided within the housing.

12. A method of operating an air conditioning system comprising a compressor having a discharge port, a suction port and a driving chamber, a controller comprising first and second refrigerant releasing means, each separately connected to the discharge port, and a heating circuit, the method comprising:

connecting the discharge port to the driving chamber by selecting both the first and second refrigerant releasing means when the compressor discharge pressure reaches a predetermined high-pressure state during the operation of the heating circuit.

13. A method of operating an air conditioning system, comprising a compressor having a discharge port, a suction port and a driving chamber, a controller comprising first and second refrigerant releasing means, each separately connected to the discharge port, a heating circuit, and a cooling circuit comprising a condenser between the discharge port and the suction port, wherein the heat exchanger is downstream from the condenser, the method comprising:

connecting the discharge port to the driving chamber of the compressor by selecting only the first refrigerant releasing means when the compressor suction pressure reaches a predetermined low-pressure state during the operation of the cooling circuit; and connecting the discharge port to the driving chamber by selecting both the first and second refrigerant releasing means when the compressor discharge pressure reaches a predetermined high-pressure state during the operation of the heating circuit.

14. A method according to claim 13, wherein the first refrigerant releasing means has a first valve provided on a first passage extending from the discharge port to the driving chamber and the second refrigerant releasing means has a second valve provided on a second passage extending from the discharge port to the driving chamber, the method further comprising:

opening the first valve when the compressor suction pressure reaches the predetermined low-pressure state during the operation of the cooling circuit and when the compressor discharge pressure reaches the predetermined high-pressure state during the operation of a heating circuit, and opening the second valve when the compressor discharge pressure reaches the predetermined high-pressure state during the operation of the heating circuit.

15. A method according to claim 14, wherein the first valve is opened in accordance with a value related to change in the discharge pressure when the discharge pressure reaches the predetermined high-pressure state during the operation of the heating circuit.

16. A method according to claim 14, wherein the first valve is opened all the time during the operation of the heating circuit.

17. A method according to claim 14, wherein a selector valve is provided on a passage extending from the discharge port to the first and second valves and the selector valve opens the first passage when the suction pressure reaches the predetermined low-pressure state during the operation of the cooling circuit and the selector valve opens both the first and second passages when the discharge pressure reaches the predetermined high-pressure state during the operation of the heating circuit.

18. A method according to claim 14, wherein a selector valve is provided on a passage extending from the first and second valve to the driving chamber and the selector valve opens the first passage when the suction pressure reaches the predetermined low-pressure state during the operation of the cooling circuit and the selector valve opens both the first and second passages when the discharge pressure reaches the predetermined high-pressure state during the operation of the heating circuit.

19. A method according to claim 14, further comprising opening one of the first and second valves in response to an outside signal.

20. A method according to claim 14, further comprising opening at least one of the first and second valves by a difference between the discharge pressure and a pressure in the driving chamber, by a difference between the discharge pressure and vacuum pressure or atmospheric pressure, or by a difference between the discharge pressure and the suction pressure.

21. A method for controlling the discharge pressure of refrigerant in an air conditioning system comprising:

releasing the refrigerant from a discharge port to a driving chamber of a compressor by selecting a first refrigerant releasing passage extending from the discharge port to the driving chamber when the compressor suction pressure reaches a predetermined low-pressure state during the operation of a cooling circuit and, releasing the refrigerant from the discharge port to the driving chamber by selecting both the first refrigerant releasing passage and a second refrigerant releasing passage extending from the discharge port to the driving chamber when the compressor discharge pressure reaches a predetermined high-pressure state during the operation of the heating circuit.

22. A method of operating an air conditioning system comprising a compressor having a discharge port and a driving chamber, and a heating circuit, wherein first and second quantities of refrigerant fluid may be selectively provided from the discharge port to the driving chamber, the first quantity being larger than the second quantity, the method comprising:

providing the first and second quantities of refrigerant fluid from the discharge port to the driving chamber at a time when the compressor discharge pressure is in a predetermined high-pressure state during operation of the heating circuit.

23. The method of claim 22, wherein the air conditioning system further comprises a cooling circuit, the method further comprising:

providing only the second quantity of refrigerant fluid from the discharge port to the driving chamber at a time when the compressor suction pressure is in a predetermined low-pressure state during operation of the cooling circuit.

24. A method of operating an air conditioning system of claim 23, wherein the first and second quantities of refrigerant fluid are each provided when the respective pressure state is reached.

25. A method of operating an air conditioning system comprising a compressor having a discharge port and a driving chamber, and a cooling circuit, wherein first and second quantities of refrigerant fluid may be selectively provided from the discharge port to the driving chamber, the first quantity being larger than the second quantity, the method comprising:

providing only the second quantity of refrigerant fluid from the discharge port to the driving chamber at a time when the compressor suction pressure is in a predetermined low-pressure state during operation of the cooling circuit.

26. A method of operating an air conditioning system of claim 25 wherein the second quantity of refrigerant fluid is provided at a time when the compressor suction pressure reaches the predetermined low-pressure state.

27. An air conditioning system comprising:

a compressor defining a driving chamber, a suction port, a discharge port, a first passage extending from the discharge port to the driving chamber and a second passage extending from the discharge port to the driving chamber, the compressor comprising a first valve along the first passage and a second valve along the second passage; and a heating circuit comprising a heat exchanger and a passage extending from the discharge port to the suction port, through the heat exchanger;

wherein the first and second valves are opened to connect the discharge port to the driving chamber by the first and second passages at a time when the compressor discharge pressure is in a predetermined high-pressure state during operation of the heating circuit.

28. An air conditioning system according to claim 27, further comprising a cooling circuit, the cooling circuit comprising a condenser upstream from the heat exchanger and a passage extending from the discharge port to the suction port, through the condenser, wherein only the first valve is opened to connect the discharge port to the driving chamber by only the first passage, at a time when compressor suction pressure is in a predetermined low-pressure state during operation of the cooling circuit.

29. An air conditioning system according to claim 28, further comprising a controller defining, at least in part, the first and second passages, wherein the first and second valves are in the at least part of the first and second passages defined by the controller.

30. An air conditioning system according to claim 29, wherein the controller further comprises a selector valve for controlling the first and second valves.

31. An air conditioning system according to claim 30, wherein the selector valve opens the first and second valves, or only the first valve, when the respective predetermined pressure state is reached.

32. A vehicle comprising:

a compressor defining a driving chamber, a suction port, a discharge port, a first passage extending from the discharge port to the driving chamber and a second passage extending from the discharge port to the driving chamber, wherein compressed refrigerant may be selectively released from the discharge port into the driving chamber to decrease the compressor output discharge capacity;

an engine for driving the compressor;

a heating circuit comprising a heat exchanger and a passage extending from the discharge port to the suction port, through the heat exchanger; and a controller defining, at least in part, a first passage extending from the discharge port to the driving chamber and a second passage extending from the discharge port to the driving chamber, the controller comprising a first valve along the first passage and a second valve along the second passage;

wherein the controller opens the first and second valves to connect the discharge port to the driving chamber by both the first and second passages when the compressor discharge pressure reaches a predetermined high-pressure state during the operation of the heating circuit.

33. A vehicle according to claim 32, further comprising a cooling circuit, the cooling circuit comprising a condenser upstream of the heat exchanges and a passage extending from the discharge port to the suction port, through the condenser, and wherein the controller opens only the first valve to connect the discharge port to the driving chamber by only the first passage, when the compressor suction pressure reaches a predetermined low-pressure state during operation of the cooling circuit.

* * * * *